2,934,405

PROCESS OF RECOVERING CRYOLITE FROM WASTE GASES

Bruno Schmidl, Berlin-Charlottenburg, Germany

No Drawing. Application January 29, 1957
Serial No. 636,857

Claims priority, application Germany January 7, 1953

3 Claims. (Cl. 23—88)

This invention relates to a process of recovering cryolite from waste products of the aluminum manufacture and more particularly to a process of recovering cryolite from waste gases escaping in the manufacture of aluminum by electrolysis of aluminum oxide dissolved in molten cryolite.

The present application is a continuation-in-part of my application Serial No. 401,403, filed December 30, 1953, and entitled "Process for Recovering Cryolite From Waste Gases," now abandoned.

Aluminum, as is well known, is produced by dissolving substantially pure aluminum oxide in molten cryolite and subjecting the resulting molten mixture at about 1000° C. to electrolysis. Thereby molten aluminum is formed at the cathode while a mixture of carbon monoxide and carbon dioxide is produced at the anode, especially if selfbaking electrodes, for instance, the so-called Soederberg electrodes are employed.

Cryolite, in said electrolytic process, serves only as a solvent for the aluminum oxide and does not participate in the electrolysis. Therefore, it should not be consumed during electrolysis. However, it is well known that the losses of cryolite, calculated for produced aluminum, are often as high as 5%. This loss is due to the fact that a noticeable decomposition of cryolite takes place at the high melting temperature. The waste gases leaving the electrolytic cell contain noticeable amounts of readily volatile fluorine compounds. The fluorine content of said waste gases is between about 10 mg. and about 30 mg. per cubic meter of gas. It is evident that the fluorine compounds are present in the waste gases in extremely dilute concentration.

The fluorine values present in the waste gases are usually recovered by subjecting the weakly acid waste gases to an intense washing process with alkaline solutions. Thereby, solutions of alkali fluoride are obtained which subsequently are reconverted into cryolite by methods known per se.

The term "fluorine values" is used herein and in the claims annexed hereto for all the fluorine compounds and fluorine itself present in the waste gases.

The known wet processes of recovering cryolite from waste gases, however, have considerable technical and economical disadvantages. It is, for instance, necessary to draw off, by suction, very large volumes of waste gases. The waste gases escaping from various electrolytic cells are then combined and conducted into washing towers of correspondingly large size wherein the very dilute waste gases are washed with large volumes of washing liquid. The resulting wash solutions are also quite dilute due to the low solubility of sodium fluoride. Furthermore, they contain also considerable amounts of sodium bicarbonate, sodium carbonate, sodium sulfate, sodium silicate and the like. Therefore, correspondingly dimensioned large plants are required for working up such dilute sodium fluoride solutions. The presence of large amounts of impurities renders extremely difficult the production of pure cryolite from the solutions by treatment with aluminum salts.

It is one object of the present invention to provide a simple, effective, and economical process of recovering the fluorine values from waste gases escaping from the electrolytic cells wherein electrolysis of aluminum oxide dissolved in molten cryolite is carried out. By this new process substantially all the fluorine values are obtained and can be converted into cryolite which can directly be used in the electrolytic process.

Other objects of this invention and advantageous features thereof will become apparent as the description proceeds.

In principle, the process according to the present invention consists in passing the waste gases through a suitable solid filtering agent capable of selectively adsorbing the fluorine values but substantially none of the other impurities present in the waste gases.

To carry out said new process, the waste gases escaping from electrolytic cells are filtered, either separately or after they have been combined, through activated alumina and more particularly through calcined anhydrous alumina $Al_2O_3$ as it is used for aluminum electrolysis, i.e. through anhydrous alumina obtained by calcining aluminum hydroxide. Such calcination, however, must be carried out without appreciable sintering or melting of the alumina since sintered or molten alumina has lost its adsorptive power and is unsuitable for the purpose of the present invention. Such an aluminum oxide is obtained, for instance, by calcining aluminum trihydrate $Al_2O_3 \cdot 3H_2O$ at a temperature between 1200° C. and 1400° C. The resulting alumina is substantially non-reactive to acid or alkaline compounds such as hydrofluoric acid but possesses considerable adsorptive power. It is capable of completely adsorbing all the fluorine values present in the waste gases from the aluminum electrolysis.

The theory is advanced without, however, being limited thereto, that the fluorine values of the waste gases substantially consist of sodium bifluoride $NaF \cdot HF$. Said sodium bifluoride is formed by decomposition of cryolite by the moisture content of aluminum oxide which amounts to about 0.1% to 0.3% and cannot completely be removed in technical operation. A water content of 0.1% will produce a loss in cryolite of about 1.5%, a value corresponding to that usually found in actual operation. The following equation illustrates the reaction which takes place between cryolite and water in the electrolytic cell at the high electrolysis temperature:

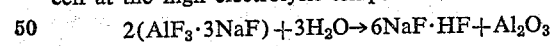

$$2(AlF_3 \cdot 3NaF) + 3H_2O \rightarrow 6NaF \cdot HF + Al_2O_3$$

The gaseous sodium bifluoride formed thereby and escaping with the waste gases is completely adsorbed by anhydrous calcined alumina. In contrast thereto, the other impurities of the waste gases such as carbon monoxide, carbon dioxide, sulfur dioxide, sulfur trioxide, silicon tetrafluoride, volatile iron compounds, and others, are not adsorbed by the alumina filter but pass therethrough. No reaction between the fluorine values and the alumina takes place. The fluorine values, however, are completely removed from the waste gases by selective adsorption by the alumina. The spent filter material, thus, represents a mixture of alumina and sodium bifluoride adsorbed therein.

That actually sodium bifluoride is adsorbed by calcined alumina is clearly demonstrated by the following test. The spent alumina filter material having the fluorine values of the waste gases adsorbed therein, is heated to about 400° C. for several hours. Thereby the loss in weight is determined. It consists of substantially pure hydrofluoric acid. Analysis of the heated alumina filter material yields a content of sodium fluoride equivalent to the loss on heating. Thus, the adsorbed fluorine values must consist of sodium bifluoride NaF.HF.

As soon as the alumina filter material has adsorbed between 10% and 20% of sodium bifluoride, it is worked up and converted into cryolite by the following method:

The spent alumina filter material is directly introduced into the electrolytic bath whereby the adsorbed sodium bifluoride is converted into cryolite according to the following equation:

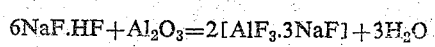

$$6NaF.HF + Al_2O_3 = 2[AlF_3.3NaF] + 3H_2O$$

It is imperative that the spent filter material is immersed into the bath and is not added onto its surface, i.e. onto the aluminum oxide covering the surface of the bath and protecting the molten cryolite against heat dissipation by radiation. If the spent filter material is added onto the heat protective alumina layer, the acid sodium fluoride adsorbed by the alumina filter material is decomposed and escapes from the electrolytic cell. In contrast thereto, when introducing the spent filter material directly into the electrolytic bath, no decomposition of the sodium bifluoride takes place. Since the capillaries of the alumina filter material are closed and sealed by the electrolytic bath, the sodium bifluoride melts under the capillary pressure without first being able to decompose.

The molten sodium bifluoride reacts in the molten state at the bath temperature of about 1000° C. with alumina according to the above given equation. Since alumina is present in a large excess over the theoretically required amount, for instance, in an amount which is 15 to 30 times greater than required, and due to the large reactive surface of the capillaries, most favorable conditions for a rapid conversion of sodium bifluoride into cryolite are encountered.

As has been found, the water vapors formed thereby according to the above given equation, escape from the bath so rapidly that they are unable to cause appreciable decomposition of the cryolite. Any insignificant decomposition which might occur yields sodium bifluoride which, in turn, is adsorbed by the alumina filter material.

This method of recovering the fluorine values from the waste gases of the aluminum electrolysis can be carried out in continuous operation. For this purpose the aluminum furnace covered completely or partly by a sheet metal hood is provided at its highest point with an outlet pipe for the waste gases. This pipe is filled with preferably tableted anhydrous alumina serving as filter material. A flap valve is provided at the bottom of said outlet pipe. It can automatically be opened and closed at equal intervals, thereby each time permitting the lower portion of the alumina filter material in the outlet pipe which portion is enriched with adsorbed sodium bifluoride, to drop down into the furnace and the electrolytic bath while the same amount of fresh alumina is supplied at the top of the outlet pipe. In this manner addition of alumina to the electrolytic bath and recovery of the fluorine values from the waste gases can readily be combined and can be effected automatically, thus, considerably reducing the fluorine recovery costs.

In principle, this process of recovering the fluorine values of the waste gases consists in passing the waste gases through the anhydrous alumina used in the aluminum electrolysis which alumina selectively adsorbs the fluorine values of the waste gases while it does not adsorb and retain the other impurities thereof, and returning the alumina with the adsorbed fluorine values to the furnace wherein it is converted into cryolite.

The outstanding feature of the present invention is that the alumina filter itself serves as cryolite recovery plant and that no further complicated wet processes of producing cryolite are required. The use of filters according to the present invention, therefore, represents the simplest solution of recovering fluorine values from waste gases of the aluminum manufacture.

As stated above, the alumina filter material may be replaced by a new charge as soon as about 10% to 20% of sodium bifluoride have been adsorbed. New filter material must be supplied as soon as appreciable amounts of fluorine values pass through the filter. In general, between 80% and 90% of the decomposed cryolite are recovered in this manner.

A further essential advantage of the present process is that it is not necessary to produce the filter material separately since the filter material is the same alumina which is produced and used as starting material in the manufacture of aluminum by electrolysis.

The filter material is preferably employed in granulated form or in any other suitable form permitting the waste gases to pass therethrough. The preferred form in which said filter material is used, is the tablet form. It is, for instance, possible to compress alumina to tablets under a pressure of about 50 atmospheres.

When used in tablet form, the filter material offers the least resistance to the flow of the waste gases. Thus, it is possible to make use of the uplift of the hot furnace gases for conducting them through the filter.

It is advisable to provide dust filters before allowing the waste gases to pass through the alumina filter material. Such dust filters, preferably, consist of very finely spun metal wire nets or nets of finely spun, fluorine resistant plastic material. Such dust filters will eliminate dust and carbon and other particles carried along by the waste gases which otherwise would contaminate the filter material.

The process according to the present invention does not require complicated apparatus, such as centrally arranged, extensive gas washing tanks and a separate and complicated system of reaction vessels for the conversion of the fluorine values removed from the waste gases, into cryolite. It is only necessary to collect the waste gases escaping from the electrolytic cell preferably by providing a suitable hood over said cell and conducting said gases into and through the alumina filter arranged in the outlet or vent pipe. The filtered gases escape from said filter in a substantially fluorine-free state.

It may be pointed out that the process according to the present invention has the great advantage that it renders electrolytic aluminum manufacture practically independent from the moisture content of the alumina used as starting material. Heretofore, the alumina had to be carefully freed of any moisture content because, as stated hereinabove, a moisture content of only 0.1% results in a decomposition and loss of 1.5% of the added cryolite and a moisture content of the alumina of 0.3% caused a loss of 4.5% of the cryolite. Calcination of alumina in order to remove the last traces of moisture, however, is a difficult and rather expensive operation. The process of recovering the fluorine values from the waste gases of the electrolytic aluminum manufacture according to the present invention permits to utilize a less highly calcined alumina containing more moisture than heretofore permissible because any decomposed cryolite is almost quantitatively recovered by the alumina filter and returned to the electrolytic bath. Thus, the manufacturing costs for alumina, the starting material in the aluminum industry, can be considerably reduced.

The following examples serve to illustrate the present invention. It is understood, of course, that this invention is not limited to the precise mode of manufacture described in said examples as the invention as defined in the appended claims can be embodied in a plurality and variety of forms and can be practiced in a plurality and variety of ways.

*Example 1*

The waste gases escaping from an aluminum furnace wherein daily 100 kg. of aluminum are produced, are passed through an outlet pipe arranged above the furnace. The outlet pipe is filled with 100 kg. of anhydrous highly calcined alumina in coarsely grained or tableted form as it is used for charging the furnace. After about 20 days the filter material is removed from the outlet pipe. It has adsorbed 25 kg. of sodium bifluoride, the main fluorine-containing component of the waste gases. 125 kg. of spent alumina filter material consisting of 80% of alumina and 20% of sodium bifluoride are obtained thereby.

This mixture is directly returned to the furnace by rapidly immersing it into the electrolytic bath. Preferably the mixture is added to the bath in portions. Thereby 25 kg. of cryolite corresponding to about 88% of the loss in fluorine during 20 days' operation of the furnace are recovered. The outlet pipe is filled with 100 kg. of fresh calcined anhydrous alumina and the waste gases are passed therethrough for the recovery of their fluorine values.

Example 2

The procedure is the same as described in Example 1. However, the outlet pipe is provided at its lower end with a flap valve which permits to discharge every second day 10 kg. of the filter material into the electrolytic bath. Said 10 kg. of filter material contain considerably more of the fluorine values of the waste gases than the remaining 90 kg. thereof. At the same time 10 kg. of fresh calcined anhydrous alumina are added at the top of the outlet pipe.

When proceeding in this manner, about 94% of the loss in fluorine are recovered and reconverted into cryolite in the electrolytic bath.

Of course, many changes and variations in the reaction conditions, the water content of the alumina filter agent, the form and size of the filtering material, the methods of working up the spent filter mass and of converting the same into cryolite, and the like may be made by those skilled in the art in accordance with the principles set forth herein and in the claims annexed hereto.

I claim:

1. In a process of recovering cryolite from waste gases leaving the electrolytic cell of the aluminum manufacture and containing fluorine substantially in the form of acid sodium fluoride, the steps which comprise passing said waste gases leaving the electrolytic cell through substantially unreactive anhydrous alumina being obtained by calcining hydrated alumina at a temperature between about 1200° C. and about 1400° C., and introducing the alumina having adsorbed thereto said acid sodium fluoride into the molten electrolytic bath, thereby converting the adsorbed acid sodium fluoride into cryolite.

2. In a process of recovering cryolite from waste gases leaving the electrolytic cell of the aluminum manufacture and containing fluorine substantially in the form of acid sodium fluoride, the steps which comprise passing said waste gases leaving the electrolytic cell through a column of cold, substantially unreactive, anhydrous alumina obtained by calcining hydrated alumina at a temperature between about 1200° C. and about 1400° C., continually returning the part of the alumina column adjacent to the electrolytic cell and having adsorbed thereto acid sodium fluoride into the molten electrolytic bath, thereby converting the adsorbed acid sodium fluoride into cryolite, and continually supplying anhydrous alumina equivalent to the amount of alumina returned to the cell to the part of the alumina column removed from the cell.

3. The process according to claim 1, wherein the anhydrous alumina is used for adsorption in the form of tablets.

References Cited in the file of this patent

UNITED STATES PATENTS

| | | |
|---|---|---|
| 1,794,377 | Hasche et al. | Mar. 3, 1931 |
| 1,873,210 | Morrow | Aug. 23, 1932 |
| 1,937,885 | Gitzen et al. | Dec. 5, 1933 |
| 2,526,776 | Smith et al. | Oct. 24, 1950 |
| 2,643,179 | White | June 23, 1953 |
| 2,656,322 | Eberle | Oct. 20, 1953 |
| 2,686,151 | Feldbauer et al. | Aug. 10, 1954 |